CIRCUIT FOR ELIMINATING SPURIOUS MODULATION OF THE SUBCARRIER FREQUENCY OSCILLATOR IN A COLOR TELEVISION RECEIVER
Filed Sept. 11, 1968
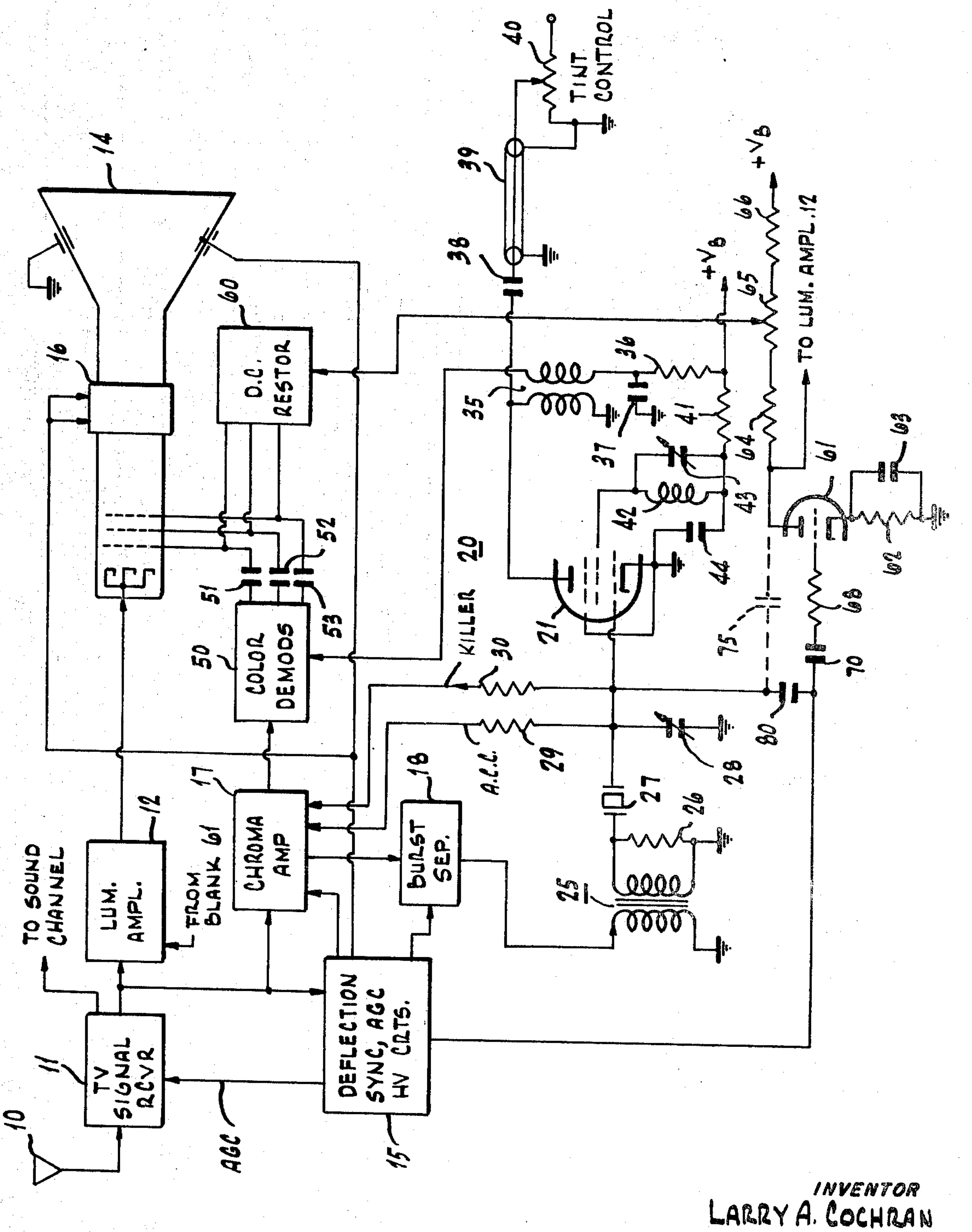
INVENTOR
LARRY A. COCHRAN
BY Eugene M. Whitacre
ATTORNEY United States Patent Office 3,541,241

Patented Nov. 17, 1970

3,541,241

CIRCUIT FOR ELIMINATING SPURIOUS MODULATION OF THE SUBCARRIER FREQUENCY OSCILLATOR IN A COLOR TELEVISION RECEIVER

Larry A. Cochran, Indianapolis, Ind., assignor to RCA Corporation, a corporation of Delaware Filed Sept. 11, 1968, Ser. No. 759,192
Int. Cl. H04n 9/46
U.S. Cl. 178—5.4 9 Claims

ABSTRACT OF THE DISCLOSURE

A phase locked color reference subcarrier oscillator operating in a color television receiver has an output modulated by a spurious pulse during a repetitive interval associated with each television line. This spurious modulation, in turn, affects the output of color demodulators, included in the receiver, to introduce an improper clamping reference for D.C. restorers used for biasing control electrodes of the kinescope. Because of the nature of such demodulators and of the modulation, the spurious level as effecting the control electrode bias varies according to a setting of a tint control potentiometer. A suitable magnitude impedance serves as a coupling path for a compensating pulse which is applied to the oscillator during said interval to substantially eliminate the spurious modulation.

This invention relates to color television receivers and more particularly to compensating circuits for cancelling extraneous modulation of the subcarrier oscillator signal employed in a color television receiver.

Conventional color television receivers employ a chroma channel which functions to retrieve color information present in a composite television signal, demodulate this information with use of a subcarrier oscillator signal and apply this information to suitable control electrodes of a color image reproducer. Essentially the chrominance signal or color information components associated with a color transmission are contained within the higher frequency band of the television signal. A chroma amplifier used in a chroma channel usually comprises one or more cascaded amplifier circuits having a relatively narrow frequency response when compared to that response of the luminance or monochrome amplifying channel. Color information is contained in chrominance sidebands which are generated at the transmitter by means of a suppressed carrier modulation technique.

In order for the television receiver to properly demodulate these sidebands and hence provide suitable color signals for application to a kinescope, a reference subcarrier waveshape must be generated therein which is both frequency and phase locked to a transmitted color subcarrier frequency. Accordingly a burst signal is transmitted as a portion of the composite video signal, occurring during the back porch interval of the horizontal synchronizing pulse, and comprising approximately 8 cycles at the suppressed carrier reference frequency (3.58 megacycles) with an invariant reference phase.

A color television receiver typically includes a circuit commonly referred to as a burst separator, which circuit functions to retrieve the transmitted burst signals by separating them from the composite or chroma signal by means of a suitably timed pulse used to gate the separator circuit. This separated burst signal is utilized to control the phase and frequency of a subcarrier generator, also contained within a color television receiver, for providing at its output a continuous wave signal at the subcarrier frequency. A plurality of demodulating circuits function in the receiver to synchronously detect the chrominance signal at selected detection angles, utilizing appropriately phased versions of the continuous wave signal. Accordingly, the outputs of the demodulators contain suitable information which is representative of the color scene transmitted and can be used for direct application to appropriate control electrodes of the color image reproducer. Outputs of such demodulators are commonly referred to as color difference signals (e.g., B–Y, R–Y and G–Y signals) each of which when applied to a suitable kinescope electrode can be caused to matrix with a Y signal or luminance signal which may also be applied to the kinescope to obtain a color display. In other instances it is possible to perform matrixing before the kinescope to obtain color signals, such as red, green and blue directly.

The color or chrominance channel of a receiver is therefore dependent upon the operation and synchronization of the color subcarrier generator or oscillator, which as described above, provides a proper reference for the demodulating circuitry included therein. Due to the above considerations and the particular demodulation techniques employed in color receiver design it is fairly imperative that the signal output of the color oscillator be relatively free from spurious modulation such as amplitude, frequency or phase modulation, due to noise or other disturbances existing in the receiver. Undesired modulation of the color oscillator can result in improper demodulation of the chrominance signals or may appear as a false input to the demodulators causing them to produce a spurious output during a period of noise and at a time when no output should exist. Such spurious modulation may be present in a subcarrier oscillator for a color receiver in which multiple vacuum tube devices are operating within the same envelope or are operating in close physical location. Such conditions can cause cross coupling of signals between these vacuum tubes by means of electromagnetic coupling, capacity coupling or otherwise, which, in turn, causes improper operation evidenced by spurious modulation of the color oscillator waveform.

For example, certain conventional vacuum tube receivers extensively utilize dual vacuum tube devices such as pentodes and triodes, whose electrodes are contained within the same glass envelope. Due to the design considerations it is sometimes necessary and expedient to combine two different functions using a different half of the dual device for each. Certain receivers, for example, use the pentode section of a dual vacuum tube as the subcarrier reference oscillator and the triode section as the horizontal blanking tube. The electrode positions and connections within the glass envelope are such that the anode or plate electrode of the triode section located close to the control grid of the pentode section. Due to the interelectrode capacity in the tube a portion of the horizontal flyback pulse couples to the grid electrode of the pentode, forming in part the 3.58 mHz. reference oscillator. This pulse, occurring at flyback time, couples to the oscillator and cause extraneous modulation of the frequency signal generated thereby. The modulated oscillator signal as coupled to the chroma demodulator causes the demodulator to produce a pulse output during this retrace interval. Depending upon the type of demodulator used, there might be a large amplification factor incorporated in the receiver subsequent to the demodulation circuit. Accordingly, the subsequent spurious output from the demodulator would be amplified and appear at the kinescope grids. This, in turn, would adversely affect the background quality of the picture as providing an improper clamping reference for synchronous clamps used to restore D.C. to the grids during the horizontal retrace interval. To further complicate matters the output frequency from the color subcarrier oscillator may be subjected to a tint control circuit for changing the phase of the subcarrier oscillations to provide tint variations in the displayed picture. Such a tint control, as affecting the phase of the oscillator, also serves, depending upon its coupling to the oscillator, to change the amount of harmonic distortion which is introduced into the oscillator waveform as coupled to the demodulators with tint control variations. Certain demodulators are relatively sensitive to harmonics of the reference subcarrier frequency and hence will provide different level spurious pulses at respective outputs due to the modulation of the oscillator and due to the setting of the tint control. In this manner the pulse outputs from the demodulators are not constant and cannot be easily compensated for by injecting cancelling pulses at the grid electrode of the kinescope or by injecting cancelling pulses subsequent to the demodulators.

It is therefore an object of the present invention to provide an improved circuit for cancelling spurious modulation in a chroma oscillator.

Still another object is to provide an improved circuit for substantially reducing amplitude modulation of a color subcarrier oscillator due to a spurious signal occurring during a repetitive interval.

A further object of this invention is to provide an improved color subcarrier oscillator whose output is relatively free from extraneous undesired modulation, as further affected by a tint control setting.

These and other objects of the present invention are accomplished in one embodiment thereof in a color receiver which utilizes a pentode as a color subcarrier oscillator. The pentode section having a relatively high input impedance is in close proximity to a second circuit operating during the horizontal synchronizing period. The oscillator, by stray coupling or electromagnetic pickup, is caused to produce a spurious modulated waveshape during the horizontal period due to a spurious pulse coupling thereto. A compensating network has an impedance selected to provide a pulse of sufficient amplitude and polarity at its output which is coupled to a suitable electrode of the oscillator circuit. This pulse serves to cancel the effect of the spurious pulse and hence retain a relatively coherent subcarrier signal output from the oscillator. In this manner color demodulators included in the receiver can no longer be affected by the spurious modulation, as it no longer exists, and hence any additional circuitry such as a tint control and so on, also coupled to the oscillator, or demodulators can no longer affect the magnitude of the pulse which would otherwise appear at the output of the demodulator without the application of this invention.

The invention together with further objects and advantages thereof may best be understood with reference to the following specification taken in conjunction with the accompanying figure which is a schematic circuit diagram of a color television receiver which employs a compensating circuit according to this invention.

Referring to the figure, an antenna 10 receives radio frequency transmitted television signals and couples them to the input of a television signal receiver 11. Television signal receiver 11 serves to process these signals by converting the radio frequency signals to intermediate or I.F. signals by means of conventional and known techniques. Such techniques may employ a mixer and a local oscillator and suitable stages of amplification to obtain a television intermediate frequency. A video detector, included in rectangle 11, is responsive to the I.F. signals to derive therefrom a composite television signal. An output of the television signal receiver 11 is coupled to a sound channel, not shown, which functions to determine the frequency modulated sound carrier and sidebands thereof to provide a signal representative of the audio transmitted for application to a suitable loudspeaker assembly. A second output of the television signal receiver 11 is coupled to a luminance or Y amplifying channel 12. Luminance channel 12 functions to amplify the wideband luminance signal contained in the composite signal, delay it a requisite amount, and provide drive suitable for application to the cathode electrodes of a color kinescope 14, which may for example be, a three-gun shadow mask tube.

Also present in a color television receiver are deflection, synchronizing, AGC and high voltage circuits 15. The inputs to these circuits may be obtained from the output of the video detector or from suitable stages of amplification in the luminance channel 12. In a manner known in the art, the AGC circuit functions to monitor the amplitude or the video signal present at the output of the video detector to develop a control voltage proportional to this amplitude to affect gain control of the R.F. and I.F. stages of amplification present in the television signal receiver 11. To further assure relatively noise immune operation, the AGC circuit may, for example, be of the keyed type and hence is usually activated by a gating pulse generated by deflection circuits also included within rectangle 15.

The function of the synchronizing circuit is to operate on the composite video signal to "strip" the synchronizing component therefrom which is necessary to assure proper representation of the television display. The synchronizing circuit, in turn, supplies an output to the inputs of the high voltage and deflection circuits. The high voltage and deflection circuits serve to generate synchronized horizontal and vertical waveshapes for deflecting the electron beams of the color kinescope 14, which action is necessary to provide a raster. Therefore an output from the high voltage and deflection circuits included in rectangle 15 is shown coupled to a yoke 16 associated with the kinescope 14 for deflecting the electron beams both horizontally and vertically under the control of the waveshapes generated in rectangle 15 and energizing yoke 16.

In many conventional receivers the high voltage necessary to operate the kinescope 14 is also generated by the rectification of appropriate pulses produced by the action of the deflection circuits contained in rectangle 15. For this purpose a further output is shown from the high voltage and deflection circuits 15, coupled to the ultor electrode or second anode electrode of the kinescope 14, which output supplies high voltage thereto.

A chrominance amplifier 17 receives an input from the source of composite television signals and serves to process the color information in the composite signal within the bandwidth associated with such information. An output of the chroma amplifier 17 is coupled to an input of a burst separator 18 having another input coupled to an output from the deflection circuits 15. The function of the burst amplifier or burst separator 18 is to retrieve and amplify color bursts which are present in the composite signal at the back porch of the horizontal synchronizing pulses. A pulse supplied by the high voltage and deflection circuits 15 is used to gate the burst amplifier, having another input from the chroma amplifier 17, during the time when bursts are present. These retrieved bursts are then used to synchronize a color oscillator 20 comprising in part a vacuum tube pentode 21. The retrieved burst signals are applied to the primary winding of a transformer 25. The secondary winding of transformer 25 has a terminal thereof coupled to an electrode of a crystal 27 which may be fabricated from a piezoelectric material and cut to resonate with an appropriate load capacity at a frequency of approximately 3.58 mHz., which is the color reference subcarrier frequency and the frequency of color bursts.

The other terminal of the secondary winding of transformer 25 is coupled to a point of reference potential. The secondary winding of transformer 25 is shunted by a resistor 26 used for providing low impedance drive for the crystal 27. The other terminal of crystal 27 is coupled to the grid electrode of the pentode 21. A variable capacitor 28 is coupled between the grid electrode of pentode 21 and a point of reference potential, and is used for tuning the crystal close to the color subcarrier frequency. A resistor 29 is coupled between the grid electrode of pentode 21 and an input to the chrominance amplifier 17. The lead coupled therebetween is referenced to as ACC or automatic chroma control. A further resistor 30 is also coupled between the grid electrode of pentode 21 and the chrominance amplifier 17 and the associated lead providing the coupling is designated as "killer." The exact nature and operation of these two resistors in conjunction with the grid electrode of pentode 21 is explained in U.S. 2,982,812 entitled "Color Television Receiver Chrominance Control Circuit" issued on May 2, 1961, to R. N. Rhodes et al.

The cathode electrode of pentode 21 is returned to a point of reference potential such as ground. The suppressor electrode is internally coupled to the cathode electrode and is therefore also returned to ground. The plate electrode of pentode 21 is coupled to a source of potential designated as $+V_b$ through a primary winding of a transformer 35 in series with a decoupling resistor 36 which is bypassed to ground for A.C. signals by a capacitor 37. The primary winding of transformer 35 is used as an inductor and is caused to resonate input with a capacitor 38, having one terminal coupled to the plate electrode of pentode 21. The other terminal of capacitor 38 is coupled through a cable 39 which also serves as a capacitor, to the variable arm of a potentiometer 40, designated as tint control; and used to vary the resonance curve and therefore the phase of the color subcarrier oscillator 20 as will be described subsequently. The screen electrode of pentode 21 is biased from the $+V_b$ source through the series combination of resistor 41 and inductor 42. Inductor 42 is in shunt with variable capacitor 43, which is selected with inductor 42 to present an inductive reactance for the oscillator at the color subcarrier reference frequency. The junction between resistor 41 and inductor 42 is bypassed for A.C. signals by means of capacitor 44. The secondary winding of transformer 35 is coupled between color demodulators 50 and a point of reference potential such as ground; and is used for applying the reference subcarrier frequency signal generated by oscillator 20 to an input of the color demodulators 50. The color demodulators 50 receive another input from the chrominance amplifier 17 and function to demodulate the color information contained in the composite signal with respect to a proper phase and frequency reference subcarrier waveshape. This action provides color difference signals, commonly referred to as the B–Y, R–Y and G–Y signals, at the output of the color demodulators 40. Accordingly, three outputs from the color demodulators 50 are each respectively coupled to a separate color grid control electrode of the kinescope 14 through capacitors 51, 52 and 53. A D.C. restorer network 60 has three outputs each one of which is coupled to an associated grid electrode of the kinescope 14. The function of the D.C. restorer network 60 is to charge capacitors 51 and 53 to a suitable D.C. level so as to bias the grid electrodes of the kinescope 14 at a point compatible with the D.C. coupled to the cathode. D.C. restorer circuits as 60 are commonly referred to as synchronous clamps and in this respect employ diodes suitably poled so as to conduct on the application of a suitable level clamping pulse obtained during the horizontal retrace time. The clamping pulse serves to provide a reference level to which the capacitors 51 to 53 will charge and thus a D.C. voltage will be stored across these capacitors which voltage remains as a quiescent biasing level during the scan interval. Such a clamping pulse is provided by means of the circuit employing triode 61 which for present purposes has its electrodes contained within the same glass envelope as that which contains the electrode of pentode 21. Triode 61 has its cathode electrode returned to a point of reference potential through a cathode biasing resistor 62 shunted by a cathode capacitor 63. The plate electrode of triode 61 is returned to the $+V_b$ source through the series resistors 64, 65 and 66. Resistor 65 of this series string is a potentiometer having its center arm coupled to the clamping pulse input terminal of the D.C. restorer 60. The grid electrode of triode 61 is coupled to an output of the deflection and high voltage circuits 15 through the series combination of resistor 68 and capacitor 70. In this manner a suitable positive level pulse occurring during horizontal retrace time is applied to the grid circuit of triode 61 and is of a sufficient amplitude to cause the triode to go heavily into conduction. When this occurs during the horizontal retrace interval, a negative pulse is developed across the series resistive plate load and therefore a negative pulse of sufficient amplitude is applied to the input of the D.C. restorers 60 which serves to clamp the grids to a required operating level as described above.

The operation of the circuit partly described above will now be explained in greater detail. During the horizontal retrace interval the grid electrodes of the kinescope are being restored to a suitable operating level for the next scan interval, the chroma channel comprising in part chroma amplifier 17 is being subjected to a pulse to cause cutoff of this channel. This technique is commonly referred to as burst elimination and is necessary to cause the outputs of the color demodulators 40 to assume their non-signal or quiescent operating condition so as to provide a reference clamping level for the D.C. restorers 60 which are now also being subjected to the clamping pulse coupled from the plate circuit of triode 61. Burst elimination further assures that the color burst signal also occurring during horizontal retrace time does not couple into the demodulators and thereby adversely affect the D.C. restoration. Furthermore during the above horizontal retrace interval the luminance amplifier 12 is also being blanked or cutoff by means of the negative pulse developed at the plate electrode of triode 61 to prevent information being displayed on the screen of the kinescope 14 during the horizontal flyback which also occurs during retrace. To provide reliable operation and assure cutoff of the luminance amplifier 12 and proper D.C. restoration of the grid electrodes of the kinescope 14 a relatively large amplitude pulse is developed by triode 61 during the horizontal retrace interval. As indicated above the pentode 21 and the triode 61 share the same glass envelope and due to the construction of such dual vacuum tubes an interelectrode capacitance 75 exists between the plate electrode of triode 61 and the grid electrode of pentode 21. This capacitance 75 serves as a coupling path for this pulse and causes a portion of the pulse to be applied to the grid electrode of pentode 21. The pulse is of negative polarity and hence serves during its duration to reduce the current flow through pentode 21, which in turn decreases the amplitude of oscillations produced by the oscillator configuration including pentode 21. This change in amplitude is coupled through transformer 35 to the input of the color demodulators 50.

It is common knowledge that certain types of demodulators which are employed in color television receivers as demodulators 50 are relatively sensitive to amplitude variations, phase variations or both of the 3.58 mHz. reference signal.

For example certain types of color television receivers employ a balanced diode configuration as a chroma demodulator and such circuits are particularly insensitive to amplitude variations of the color oscillator signal as long as good balance is maintained by specifying component tolerances and furthermore assuring that the amplitude of the reference signal into the demodulators is at least twice the amplitude of the chroma signal. However, while such demodulators are relatively amplitude insensitive they are particularly sensitive to harmonic distortion which is present in the reference waveshape. The situation further becomes complicated due to the fact that the harmonic distortion which is introduced into the oscillator reference waveform, in part, due to the coupling thereto of the spurious pulse through capacitor 75 also varies with the setting of the tint control potentiometer 40. Accordingly, the amount of harmonic distortion and consequently the amount of pulse output from the chroma demodulators also depends upon the setting of the tint control 40 which is adjustable by and according to the preferences of the viewer. This then results in an undesired color temperature shift or background tint variation as a function of the setting of the tint control. The problem is further aggravated in a receiver using balanced diode demodulators. Such demodulators have a conversion gain of less then unity and therefore it is necessary to introduce a relatively large amount of amplification after the demodulators in order to achieve an adequate voltage level necessary to drive the kinescope grid electrodes. Therefore, due to this large gain factor a pulse output from chroma demodulator 50 will appear at the kinescope grid electrodes with a sufficient amplitude to cause D.C. restoration to take place at an incorrect level which consequently produces the above mentioned background tint variation. As this background tint varies according to tint control setting one cannot compensate for it by using a pulse cancelling technique as described in a copending application entitled "Color Television Receiver" by Donald H. Willis.

The pentode oscillator 21 is an electron coupled device which is known in the prior art and derives its name from the fact that electrons are intercepted by the screen electrode of pentode 21 represent the oscillator plate current that produces the oscillations. The remaining electrons, which represent most of the space current passed through this screen go on to the plate, where they produce output power by flowing through the load impedance that is connected in series with the plate electrode. Essentially the load impedance has little effect on the frequency of oscillation because the plate current of a pentode is relatively independent of the plate potential and hence of the load impedance in the plate circuit. This assumes, however, that the minimum plate potential is not so low as to cause the formation of a virtual cathode which effect is also well known in the art.

In this manner the crystal 27 located in the grid electrode circuit of pentode 21 and the circuit in the screen bias path comprising inductor 42 and capacitor 43 and the grid to screen capacity of pentode 21, primarily determine the resonant frequency of the oscillator. In this respect plate current variations occurring nominally about the reference subcarrier frequency appear across the primary winding of transformer 35. Capacitor 38 serves in combination with cable 39 and a tint control 40 to vary the resonant frequency of the plate circuit in a manner to obtain the desired phase shift associated with a conventional tint control function. The technique and phase shift available by the above described combination behaves as that described in U.S. Pat. No. 3,881,245 entitled "Phase Shifting Circuits for Color Television Receivers," issued on Apr. 7, 1959 to A. F. Fenton et al. and assigned to the same assignee as this invention.

The reason why second harmonic distortion is a function of the tint control potentiometer 40 and a function of the spurious pulse as well, is as follows. In essence the changing of the tint control potentiometer 40 serves to introduce more or less capacitance in shunt with the primary winding of transformer 35. This in turn slightly changes the resonance curve of the tuned circuit without affecting the oscillator frequency by causing the subcarrier reference frequency to undergo a phase change as a function of its displacement from the changed center frequency associated with the resonance curve due to the variation of the tint control. A change in the resonance curve in turn causes a change in the amount of signal available across the transformer 35 and further results in a poorer filtering action of the resonant circuit due to the operation at a point off the center frequency. Therefore any second harmonic present in the oscillator waveform due to the very nature of the nonlinearities that exist in an oscillator circuit is less discriminated against when tint control is introduced. Secondly, the spurious pulse itself being of negative polarity tends to decrease the total current capable of being drawn by the pentode, and during retrace time will serve as an additional bias moving the operating point of the oscillator closer to cutoff which is towards a more nonlinear region of the pentode characteristics. This causes the oscillator waveform to contain more harmonic distortion than it would during normal operation.

As indicated the coupling of the negative blanker pulse appearing at the plate electrode of triode 61 to the grid electrode of pentode 21, serves to drive the pentode towards cutoff and hence produce a substantial amount of amplitude modulation of the oscillator waveform during horizontal retrace time. That is, during this time the effective amplitude of the color reference oscillator is much lower then it was during the scan interval. The affect of amplitude modulation on certain demodulators may be sufficient itself to cause the device to produce spurious pulses at an output which pulses would serve to adversely affect the D.C. level to which the grid electrodes of the kinescope 14 are clamped. Such amplitude variations, as will be explained, would also cause background variation of the color picture as a function of the setting of the tint control potentiometer 40. In the case of a balanced diode demodulator it is well known that for perfect or highly precise components such as matched diodes, selected resistors and so on, the output is relatively unaffected by the subcarrier reference signal amplitude. However, with practical circuits optimum balance is at best difficult to achieve and of course, a suitable compromise may be tolerated. In any case assume that the diode demodulator is not perfectly balanced due to natural tolerance and existing differences, and in this manner each of the two diodes incorporated in such a demodulator causes a different voltage with respect to ground, to appear across a suitable R.C. network associated with the demodulator. These voltages, if equal, would nominally serve to cancel at the output of the demodulator to produce a difference voltage whose magnitude is nominally zero volts. This would occur, for example, for the application to the demodulator of only the subcarrier reference frequency signal. Accordingly if components values were different or tolerances varied the voltage at the output of the demodulator would not be zero volts, but would be at some positive or negative value depending on which branch of the demodulator caused the unbalance. Practically speaking, some unbalance always exists in such demodulators and due to economic considerations, which are paramount in the design of commercial equipment, variable potentiometers or adjustable capacitors are not desired. Consequently if an imbalance occurs which is of a small enough magnitude as to not to affect operation it is left alone. However, due to the peculiar characteristics of such demodulators, they may be both amplitude and phase sensitive as well as being sensitive to variations in harmonic content and phase shifts of harmonics as well. These peculiarities are cumulative and tend to produce larger differences than would be produced by only one effect. Therefore if there was an imbalance in the demodulators, purely on an amplitude basis, the amount of imbalance produced at the output of the demodulator would vary as a function of the tint control as well. This is so as the affect of the tint control is to change the resonance curve of the tuned plate circuit associated with pentode 21. The change is afforded by an effective repositioning of the center frequency associated with the amplitude versus frequency characteristic of such a resonant circuit. In this manner for different settings of the tint control potentiometer 40 the amount of 3.58 mHz. subcarrier that is coupled to the demodulator depends upon where the center frequency of the frequency versus amplitude curve is set. For example, for a setting of 45° phase shift of the subcarrier signal as applied to the demodulator, the 3.58 mHz. subcarrier amplitude would be attenuated by 3 db as compared to that amplitude which would be coupled to the demodulator for a zero degree phase shift corresponding to a center frequency of 3.58 mHz. Therefore it is apparent that the potential at the output of the demodulator due to the changing amplitude of the subcarrier during retrace and as affected by the tint control would vary accordingly and could therefore, if of a sufficient amplitude, cause the grids of the kinescope to be clamped to improper levels.

It is also noted that other types of demodulators, such as those employing multi grid electron tube devices, where the chroma signal may be applied to the grid and the oscillator signal applied to the screen electrode, pentagrid type demodulators, differential demodulator configurations and so on; all of which can be conveniently employed in a color television receiver as a color demodulator, are more prone for certain of these circuits to amplitude variations and less affected by harmonic distortion, while of others the opposite may be true. In this manner it can be shown that various demodulator configurations all of which are known and have been analyzed in the prior art can produce spurious outputs according to the type of spurious modulation that accompanies the subcarrier reference frequency signal as applied thereto. In this respect it would be advantageous to eliminate or substantially reduce the tendency of the oscillator, providing the subcarrier reference signal, to be affected by noise signals causing amplitude, frequency or phase modulation during a repetitive interval associated with the television line.

In order to eliminate undesired coupling of the spurious pulse between the pentode 21 and the triode 61 a portion of a positive flyback pulse is coupled to the oscillator grid electrode through capacitor 80. The magnitude of capacitor 80 is selected in accordance with the magnitude of capacitor 75 and of the amplitude of the blanking pulse appearing at the plate electrode of triode 61 to couple in a positive pulse which serves to substantially cancel the spurious pulse at the grid electrode of pentode 21. This in turn serves to maintain the proper bias of the pentode oscillator during horizontal retrace intervals and to confine second harmonic or harmonic distortion in general to that amount normally afforded by variation of the tint control which is of a small enough level to produce proper good quality color presentations.

Furthermore by cancelling the spurious pulse which would otherwise be coupled to the grid electrode of pentode 21 the amplitude of the oscillator signal is maintained at relatively the same level that was available during scan time and hence none of the adverse affects due to amplitude modulation affect the output of the demodulator and therefore the quality of the final color presentation.

A circuit incorporating the advantages of the above described invention used the following components.

Transformer 25—RCA #1472618–5
Transformer 35—RCA #1472619–4
Resistor 26—390 ohms
Resistor 29—68K ohms
Resistor 30—150K ohms
Resistor 36—6,800 ohms
Resistor 40—10K ohms (variable)
Resistor 41—100K ohms
Resistor 62—1K ohm
Resistor 64—5,600 ohms
Resistor 65—3K ohms (variable)
Resistor 66—8,200 ohms
Resistor 68—68K ohms
Capacitor 28—1 to 6 micromicrofarads (variable)
Capacitor 37—.01 microfarad
Capacitor 38—33 micromicrofarads
Capacitor 42—8 micromicrofarads
Capacitor 44—.01 micromicrofarad
Capacitor 63—820 micromicrofarads
Capacitor 70—150 micromicrofarads
Capacitor 80—.3 micromicrofarad
Interelectrode—approximately .75 micromicrofarad
Interelectrode capacitance 75—approximately .75 micromicrofarad
Crystal 27—3.58 mHz. crystal
Pentode 21—1/2 6GH8A
Triode 61—1/2 6GH8A
$+V_b$—+270 volts
Capacitors 51, 52, 53—.01 microfarad
Line 39—approximately 30 inches of shielded cable.

The blanking pulse coupling from the high voltage deflection, synchronizing and AGC circuits 15 to the grid electrode of triode 61 had a magnitude at the junction of capacitors 80 and 70 of approximately 600 volts peak to peak. This pulse caused a negative pulse of approximately 200 volts peak to peak to appear at the plate electrode of triode 61.

What is claimed is:

1. In a color television receiver adapted to receive a television signal, said television signal including transmitted color synchronizing bursts consisting of oscillatory information and occurring during prescribed time intervals and having a prescribed phase and frequency, means responsive to said oscillatory bursts to separate said bursts from said television signal, oscillator means for providing a frequency substantially equal to that frequency associated with said bursts, means for applying said bursts to said oscillator for locking said oscillator, said oscillator means being subjected to a spurious pulse during an interval encompassed within said prescribed time interval, at least one color demodulator having an input thereof coupled to an output of said oscillator means, said demodulator responsive to said oscillator signal and said spurious modulation to provide at an output thereof, an extraneous pulse of an amplitude sufficient to affect the quality of the scene displayed by said receiver, in combination therewith comprising:

(a) means coupled to said oscillator for applying a suitable amplitude pulse thereto during said prescribed time interval and of a polarity to substantially cancel said spurious pulse, whereby said oscillator is relatively free from said modulation during said prescribed interval.

2. Apparatus for use in a color television receiver comprising:

(a) a vacuum tube having at least a triode and a pentode section, said triode and said pentode section each having grid, cathode, and plate electrodes, said pentode section further having a screen and a suppressor electrode, all of said electrodes contained within a common enclosure for confining said vacuum, an interelectrode capacitance between the plate electrode of said triode and the grid electrode of said pentode, (b) means coupled to said pentode section for operating said pentode section in an oscillator configuration for providing an oscillatory signal at its plate electrode whose frequency substantially equals the color reference subcarrier frequency, (c) means coupled to said triode section for causing said triode to conduct during a prescribed interval associated with each television line, said conduction causing a pulse to appear at said plate electrode of said triode during said prescribed interval, which pulse couples to said grid electrode of said pentode via said interelectrode capacitance to adversely affect the characteristics of said oscillatory signal at said plate electrode of said pentode, (d) means coupled to the grid electrode of said pentode for applying a compensating pulse of sufficient amplitude and polarity and occurring during said prescribed interval for substantially cancelling said pulse coupled via said interelectrode capacitance.

3. Apparatus for use in a color television receiver, comprising:

(a) oscillator means operating to provide a relatively undistorted color subcarrier reference signal at an output thereof, (b) first means having an input responsive to a blanking pulse occurring during a synchronizing interval contained in a composite television signal for providing a relatively large amplitude pulse at an output thereof during said interval, said oscillator means and said first means being located with respect to each other to provide a stray coupling path sufficient to adversely apply a portion of said relatively large amplitude pulse to said oscillator means during said interval, to cause said oscillator means to provide a distorted reference signal during said interval, (c) means coupled between said oscillator means and said input to said first means for injecting a selected portion of said blanking pulse to said oscillator to substantially cancel that portion of said relatively large amplitude pulse coupled to said oscillator whereby said reference signal remains substantially undistorted.

4. In a color television receiver of the type employing a color image reproducer having color control electrodes to each of which is applied a separate color control signal and a separate D.C. level for operating said electrodes at a suitable bias and furnishing a proper color control drive level, said D.C. level obtained from synchronous clamping circuit operative during a repetitive interval associated with each television line, said color control signal processed by means in said receiver for demodulating color information contained within a composite television signal with reference to the phase and frequency of signal provided by a subcarrier generator included in said receiver, and locked to oscillatory bursts also contained in said composite television signal, and subcarrier generator as operated in said receiver being adversely affected by a pulse occurring during said repetitive interval and necessary to perform blanking for said color image reproducer during said inteval, said pulse causing said generator to produce a distorted signal sufficient to affect the level of said D.C. restoration during said repetitive interval by affecting said means for demodulating said color information, in combination therewith:

(a) means coupled to said generator for injecting a signal thereto of a sufficient amplitude and polarity and occurring during said interval for substantially cancelling the effect of said pulse whereby said output signal of said generator remains sufficiently undistorted so as not to affect said D.C. restoration.

5. Apparatus for use in a color television receiver, said receiver including circuitry suitable for processing a composite television signal, comprising:

(a) first means for providing a substantially undistorted oscillatory signal having a frequency substantially equal to that of a color reference subcarrier burst signal present in said composite signal during a color transmission, (b) at least one color demodulator coupled to said first means and responsive to a selected band of frequencies also present in said composite signal, for providing at an output thereof a color signal representative of color content present in said composite signal, said demodulator signal output amplitude partly dependent upon the phase and frequency of said oscillatory signal, (c) a tint control coupled to said first means for varying the phase of said undistorted oscillatory signal over a desired range, (d) a color image reproducer having at least one color control terminal, (e) means for coupling said demodulator to said color control terminal for applying said color signal thereto, (f) a generator for providing a gating signal during a repetitive interval associated with each television line, said repetitive interval associated with that portion of said composite signal containing synchronizing information, said generator located with respect to said first means to provide a stray coupling path therebetween said path having a sufficient magnitude impedance to adversely couple a portion of said gating signal to said first means causing said first means to provide a distorted oscillatory signal during said interval, (g) means coupled to said color control terminal and said generator output for providing a D.C. bias to said terminal during said repetitive interval necessary to operate said terminal at a suitable quiescent level in accordance with a predetermined output from said demodulator during said interval, said predetermined output having a desired level being dependent upon said first means signal remaining undistorted whereby said demodulator produces an incorrect predetermined output during said interval in accordance with said distortion of said first means, said distortion further causing said tint control setting to vary said incorrect predetermined output, (h) means coupled between said first means and said generator for applying a portion of said gating signal to said first means of proper phase and amplitude to substantially cancel said adversely coupled gating signal, whereby said demodulator provides said desired predetermined output relatively independent of the setting of said tint control.

6. The apparatus according to claim 5 wherein, said first means comprises:

(a) a vacuum tube pentode oscillator employing reactive circuits in the grid and screen electrodes, said reactive circuits suitably coupled and of sufficient impedance to cause said pentode to provide said subcarrier reference frequency signal by oscillating in an electron coupled mode.

7. The apparatus according to claim 6 wherein said tint control is coupled to said reactive circuit employed in said plate electrode of said pentode for varying the center frequency of the bandpass characteristic of said reactive circuit above and below the frequency of said subcarrier reference frequency.

8. The apparatus according to claim 6 wherein said generator for providing a gating signal during a repetitive interval comprises a triode amplifier having a grid, cathode and plate electrode which electrodes are located within the same vacuum tube device as said pentode whereby an interelectrode capacitance exists between the plate electrode of said triode and the grid electrode of said pentode thus forming said stray coupling path.

9. The apparatus according to claim 8 wherein said means coupled between said first means and said generator is a capacitor coupled between said grid electrode of said pentode and said grid electrode of said triode.

References Cited

UNITED STATES PATENTS

| | | | |
|---|---|---|---|
| 2,815,464 | 12/1957 | Wright et al. | 313—301 |
| 2,879,328 | 3/1959 | Larky | 178—5.4 |
| 2,879,329 | 3/1959 | Larky | 178—5.4 |

ROBERT L. GRIFFIN, Primary Examiner

JOHN C. MARTIN, Assistant Examiner